Patented July 13, 1954

2,683,716

UNITED STATES PATENT OFFICE 2,683,716

DERIVATIVES OF PYRIDOXAL

Walter A. Winsten, Forest Hills, N. Y., assignor to Food Research Laboratories, Inc., Long Island City, N. Y., a corporation of New York No Drawing. Application May 26, 1950,
Serial No. 164,600

2 Claims. (Cl. 260—295)

This invention relates to newly discovered growth factors for micro-organisms; and in particular is directed to the hydrogenated compounds obtained upon the reduction of the reaction products of pyridoxal with para amino benzoic acid, para amino benzoic acid amides, and para amino benzene sulfonic acid amides.

These new compounds probably have the structural formula:

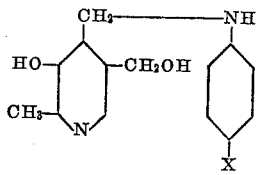

wherein X stands for COOH, CONHR, and $SO_2NHR'$ in which R designates a carboxylic acid residue and R' designates substituents such as thiazolyl, diazolyl, pyridyl and the like.

Heyl et al. (Abstracts, American Chemical Society, 113th meeting, Chicago, Ill., April 19, 1948, page 914C) and Snell and Rabinowitz (ibid, page 16C) have reported that pyridoxal and amino acids react with each other to produce Shiff bases; and that these bases may be reduced by hydrogenation using platinum dioxide, $PtO_2$. These workers in this art reported however, that all the pyridoxyl compounds made by them were inactive for micro-organisms. Heyl et al. have also reported (Jour. Am. Chem. Soc. 70, 1670 (1948)) on the reactions of pyridoxal with amines such as benzylamine, tyramine, tryptamine, histamine, etc., and the corresponding pyridoxal compounds prepared by the reduction of the Shiff bases so produced. They found that, although the pyridoxylamines so made by them were active in animals, those amines were not active growth factors for micro-organisms.

I have discovered that the reduction products obtained upon hydrogenation of the reaction products of pyridoxal and para-aminobenzoic acid, or related compounds in which an amino group is positioned para to the acid group (or acid "amide" group) linked to a benzene nucleus possess, surprisingly, activity for the growth of micro-organisms.

This invention therefore has for some of its principal objects the provision of the novel Shiff bases such as are produced by the reaction of pyridoxal and the acid aromatic para amines or the amides of said amines, and the provisions of the novel compounds obtained by the reduction of such Shiff bases from the imine state to the amine state.

Illustrative examples of this invention are as follows:

Example 1

203 mg. of pyridoxal hydrochloride and 137 mg. of para amino benzoic acid were dissolved in 5 ml. of methanol. A red precipitate developed which was then filtered. It was the N-pyridoxylidene para aminobenzoic acid having:

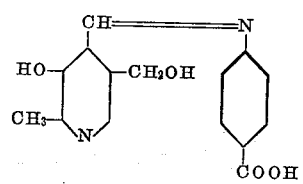

This Shiff base is poorly soluble in water, but soluble in dilute alkali.

30 mg. of the base were dissolved in 18 ml. of methanol containing 1 drop of potassium hydroxide. This solution was then subjected to hydrogenation using 30 mg. of platinic oxide, $PtO_2$, as the catalyst and carrying out the reduction at a pressure of 1 atmosphere at room temperature. When the hydrogenation was completed, the color of the Shiff base disappeared.

Paper chromatographic analysis of the product obtained on the reduction of the aforesaid Shiff base, using *Saccharomyces carlsbergensis*, American Type Culture Collection (ATCC) 4228 as the microbial indicator, revealed the presence of a new growth factor together with some unreacted pyridoxal and some pyridoxine.

By using butanol as the developing solvent (method of Winsten and Eigen, Proc. Soc. Exp. Biol. Med., 67, 513 (1948)) it was found that the new growth factor moved more slowly than either pyridoxal or pyridoxine. This new growth factor is probably N-pyridoxyl-para amino benzoic acid having the formula:

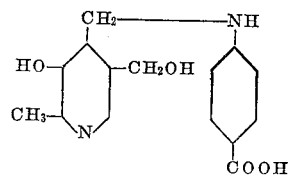

Example 2

26.6 mg. of benzoylglutamic acid were dissolved in 5 ml. of 95% ethanol, and 20 mg. of potassium hydroxide in 1 ml. of 95% ethanol was added thereto. Then 20.3 mg. of pyridoxal hydrochloride was added to the foregoing which resulted in the development of a yellow color but of cloudy appearance. Attempts to overcome the cloudiness by adding more alcohol and heating were without success.

The cloudy material was then subjected to hydrogenation with hydrogen for one hour, using 30 mg. of platinic oxide, $PtO_2$, at 1 atmosphere at room temperature.

The reduction product, when subjected to paper chromatographic analysis, showed the presence of 2 new growth factors besides unchanged pyridoxal and pyridoxine observed at the highest level tested. The slowest one may be an impurity that previously had been observed in pyridoxal itself. The next slowest one is probably N-pyridoxyl-para amino benzoyl glutamic acid having the formula:

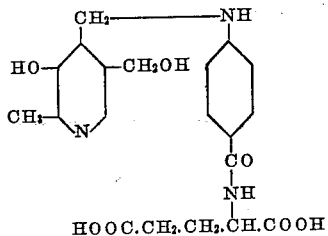

This new growth factor moves more slowly on the chromatogram than the N-pyridoxyl para amino benzoic acid of Example 1.

In accordance with the procedures hereinabove described other acidic and acid amide aromatic amines such as the sulfa drugs may be reacted with pyridoxal to produce Shiff bases, and then such bases may be hydrogenated so as to convert them from imines to the corresponding amines having the general formula:

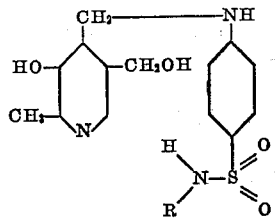

wherein R stands for the substituents present in the various sulfa drugs such as pyridyl, thiazolyl, diazyl, and the like.

It will be understood that the foregoing description of this invention is merely illustrative of its principles, and, accordingly, the appended claims are to be construed as defining the invention within the full spirit and scope thereof.

I claim:

1. Para-(pyridoxyl amino) benzoic acid having the structural formula

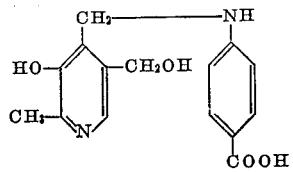

2. N-pyridoxyl-para amino benzoyl glutamic acid having the structural formula

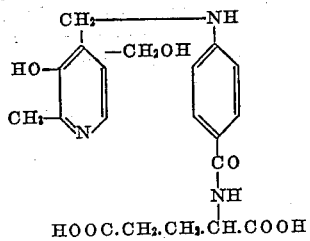

References Cited in the file of this patent

UNITED STATES PATENTS

| Number | Name | Date |
|---|---|---|
| 2,540,946 | Hoffman | Feb. 6, 1951 |